United States Patent Office 3,793,250
Patented Feb. 19, 1974

3,793,250
PROCESS OF MAKING A MODIFIED POLYESTER IMIDE WIRE INSULATION AND PRODUCT OBTAINED THEREBY
Karl Schmidt and Gerhard Boockmann, Hamburg, Germany, assignors to Dr. Beck & Co. AG., Hamburg, Germany
No Drawing. Continuation of abandoned application Ser. No. 838,382, July 1, 1969. This application Dec. 17, 1971, Ser. No. 209,415
Int. Cl. C08g 20/30, 20/32
U.S. Cl. 260—75 N
8 Claims

ABSTRACT OF THE DISCLOSURE

A polyester imide lacquer is formed by reacting a polycarboxylic acid, a polybasic alcohol, a poly-functional amino compound or derivative of these compounds in the presence of a solvent and a condensation catalyst, at least one of the starting materials including at least one five-member lactam ring and at least one other of the starting materials including at least one five-member imide ring.

The lacquer thus formed retains the high heat resistance of pure ester imide resins but has improved lacquer properties, and increased surface hardness and better application properties for forming a wire coating.

BACKGROUND OF THE INVENTION

This application is a continuation of Ser. No. 838,382, filed July 1, 1969, and now abandoned.

The invention relates to a process of making improved polyester imide wire lacquers.

It has already been proposed to employ condensation products which have been made from raw materials including among others cyclic imide groups as lacquers for insulating electrical conductors. Condensation products have likewise been used for this purpose which are made upon simultaneous formation of cyclic imide rings during the condensation. Wire lacquers are preferred in this group which to a large extent are of an aromatic nature. These wire lacquers are distinguished by excellent thermal resistance. They have a high resistance in particular against brief overheating as well as a long life at increased temperatures.

From U.S. Pats. 2,626,223 and 2,821,517 it is known also to form wire lacquers from condensation products which are obtained by reacting an ethylenically unsaturated polycarboxylic acid with a primary amino compound. The ethylenically unsaturated polycarboxylic acids may for instance be itaconic acid or aconitic acid.

When ethylenically unsaturated polycarboxylic acids are reacted with primary amino compounds, it is well known that an addition reaction takes place between the amino group and the ethylenic double bond. This is particularly the case if the double bond is activated by an α-position carbonyl group. There is then formed a secondary amino compound. If these latter compounds include a δ-positioned carboxyl group relative to the amino group a condensation takes place upon formation of a five-member lactam ring as appears from the following formula $$R_1-\overset{O}{\overset{\|}{C}}-CH-CH_2$$
$$\underset{CH_2-O}{|} \underset{\overset{\|}{O}}{\diagdown} N-R_2$$

This reaction in particular occurs with itaconic acid and aconitic acid. The attachment of the amino group to the double bond and the subsequent ring-closure reaction occurs with such ease that, in case of simple condensation of itaconic or aconitic acid with primary amino compounds the described reaction will take place in all instances.

The wire lacquers which are formed on the basis of itaconic or aconitic acid and amino compounds and which have been described in the older United States patents are, however, to a large extent on an aliphatic base, that is they are formed by using aliphatic amino alcohols and/or diamines. The thermic resistance of condensation products of this type is rather low compared to the known ester imide resins.

Further, if itaconic or alternatively aconitic acid is reacted with an aromatic primary amino group-containing compound which also contains further ester-forming or amide-forming functional groups, five-member lactam rings are obtained in the formed di- or polycarboxylic acids or hydroxycarboxylic acids which, when used for wire lacquers, do not have a sufficient resistance against extended thermal stress and against brief overheating. This is presumably due to the partly aliphatic structure.

It is therefore an object of the invention to provide for an improved polyester imide lacquer composition which has better properties for application as a lacquer and, at the same time, retains the high heat resistance of the pure ester imide resins, and which also otherwise is improved in its properties, such as by an improved surface hardness and which, in addition, can be formed and applied in an economical and rapid manner.

SUMMARY OF INVENTION

These objects are met by a process comprising reacting (a) at least one poly-carboxylic acid, (b) at least one poly-basic alcohol, (c) at least one poly-functional amino compound or (d) a functional derivative of said components at (a) to (c) which is adapted to form an ester or amide, and further including (e) a solvent for the compounds at (a) to (d) and a condensation catalyst, at least one of the components at (a) to (d) including at least one five-member lactam ring and at least one other of the components at (a) to (d) including at least one five-member imide ring as part of the functional groups present in said compounds.

The invention also embraces the products obtained by this process.

DESCRIPTION OF THE PREFERRED EMBODIMENTS

The invention is based on the surprising finding that wire lacquers can be obtained with unexpectedly improved properties if the poly-functional raw materials used in making these lacquers at the same time include a raw material containing a lactam ring that is substituted at the nitrogen atom and containing a similarly substituted five-member imide ring.

It has also been found that the raw materials containing the lactam groups and the raw materials which include the imide groups must not necessarily be formed separately but may be formed simultaneously or successively in the course of the condensation reaction. This then enables to make high-grade condensation products in a one-stage process. By combining the raw materials which include or form imide groups with raw materials which include or form lactam groups it is possible to obtain a wire lacquer which has better lacquering properties, that is better application properties, than the pure ester imide lacquers. While this is accomplished it is possible to retain the long-term heat resistance of the pure ester imide resins. The modification by means of a lactam group also results in an increased surface hardness of the final product. It has also been found that the products as compared with pure ester imide lacquers can be processed and applied more rapidly, which results in substantial economies.

The weight proportion of the raw materials which contain the five-member lactam rings or form these rings, as compared with the raw materials which include or form the five-member imide rings preferably is between 1:1 and 1:4. Preferably the ratio is 1:2.

It has also been found that ester imide wire lacquers with these improved properties can even be obtained if the ester imide wire lacquers formed according to the state of the art, are mixed with lacquers which contain ester-type polycondensates of which the essential residue is formed by N-substituted lactam ring-containing polycarboxylic acids or hydroxycarboxylic acids.

The proportion for forming the mixture preferably should be so selected that the above limits of the weight proportions for the reaction of the two components are maintained.

Suitable solvents for making the wire lacquers are the conventional cresolic solvents and the usual diluents. As catalysts it is possible to use the conventional condensation catalysts, preferably o-titanic acid ester.

The reaction components for the condensation products are preferably the conventional poly-basic alcohols, amines and carboxylic acids or derivatives of these compounds which have a functional group adapted to form an ester or amide.

The polycarboxylic acids which may be used in this connection are for instance trimellitic acid anhydride, pyromellitic acid dianhydride, naphthalene tetracarboxylic acid dianhydride as well as dianhydrides of tetracarboxylic acids with two benzene nuclei and also terephthalic acid. Preferred as primary amino compounds are aromatic diamines such as benzidine, diaminodiphenyl-methane, -ketone, -sulfone, -sulfoxide, -ether, phenylenediamine, toluylene diamine, xylylenediamine and diamines with 3 benzene nuclei and corresponding higher basic amines. Also useful are amino alcohols such as mono-ethanol- or monopropanol-amine or aminocarboxylic acids such as glycine, aminopropionic acid, aminocaproic acid and also aminobenzoic acid. Examples of alcohols are ethyleneglycol, propyleneglycol, butyleneglycol, glycerin, trimethylolpropane, pentaerythrite and tris-betahydroxyethylisocyanurate.

The five-member lactam ring containing compounds can be made by reacting itaconic acid with primary aromatic amino compounds. These compounds must include in addition to the amino group a further group in the molecule which is adapted for forming an ester or amide.

Preferred are the aromatic diamines such as those mentioned above.

The following ExamplesA and B explain the separate formation of the polyester lactam wire lacquer and the ester imide wire lacquer which can be used as components of the final mixture.

EXAMPLE A

In this example a 2 liter glass apparatus was used which consisted of a 2 liter flask, electric heating equipment, a stirrer, a thermometer and a water trap or separator. Into this apparatus there were placed 93.0 g. glycol, 285 g. tris-betahydroxyethylisocyanurate, 396 g. 4,4'-diaminodiphenylmethane, 516 g. itaconic acid and 225 g. cresol DAB IV/M. The reaction mass was then carefully heated to 140° C. At about 100° C. the mass became clear and at about 130° C. a light-yellow precipitate formed. This was the dicarboxylic acid which was formed from 2 mole itaconic acid and one mole 4,4'-diaminodiphenylmethane according to the following formula:

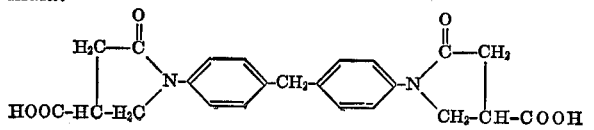

The reaction mass was then subjected to further heating, care being taken that the distillation temperature remained between 100 and 104° C. After 4 hours, a temperature of 220° C. was reached. At this point 164 ml. of condensation products of high volatility, particularly water, distilled off. At 220° C. the condensation was continued for an additional 2 hours. The mass was then diluted with cresol DAB I (German Pharmacopaea) to obtain a mass containing 60% solids. To this solution there were then added 1% butyl titanate relative to the solids content. The butyl titanate had been dissolved prior to this in 10% cresol (DAB IV). It was added at a temperature of 140° C. The mass was then subjected to stirring for one hour at 140° C., and the viscosity was subsequently adjusted with a mixture of solvent-naphtha and cresol DAB IV (at a ratio of 7:3) so as to obtain a viscosity of 500 cp. at 20° C. The thus-obtained wire lacquer had a solids content of 29%.

The lacquer was then applied to a one-millimeter round copper wire at a temperature of 480° C. by passing the wire six times through an oven of a length of 3.5 m. with a drawing speed of 7 m./min.

The thus-obtained lacquer wire had a diameter increase of 50μ. The following is the evaluation of this coated wire:

Outside fiber stretch (determined according to the method of Beel, Romm and Luthardt, ETZ–A vol. 77, issue 22, p. 830)—72.5%

Hardness of the lacquer insulation determined by leads (Faber Castell Manufacturer) by the DIN 46453 method—6H Heat-shock test according to DIN 46453 1 hour 200° C. 3-times its own diameter Softening temperature according to DIN 46453—340° C.

Wire aging: After 24 hours aging at 200° C., the insulation was coil proof when coiled about 3 times its own diameter at a tensile stress of 0.5 kp./mm.². The lacquer surface was smooth and uniform.

EXAMPLE B

This example illustrates the making of an ester imide wire lacquer as one of the components of the mixture.

1.5 mol glycol, 1.1 mol tris-betahydroxyethylisocyanurate 2 mol 4,4'-diaminodiphenylmethane, 4 mol trimellitic acid anhydride were placed in an apparatus as described in Example A, together with an amount of cresol DAB IV of 40 wt. percent relative to the just-mentioned solids. The mass was then heated to 100° C. Thereupon, 10 g. of 10% solution of butyl titanate monomer in cresol DAB IV were added to the mass. Heating was continued carefully upon stirring. At 130–140° C. the mass started to solidify. While heating was continued carefully to 220° C. during the course of 5 hours, the mass again became stirrable at about 170° C. After reaching the point where the mass became clear, that is 210° C., the condensation was continued at 220° C. for another two hours. At this time there had been distilled off 170 m. of a predominantly aqueous distillate. The mass was now cooled to 140° C. and subsequently reacted with a solution of a butyl titanate monomer in an amount of 10%, the solution being a 10% solution in cresol DAB IV. Stirring was then effected for an hour at 140° C. and, thereafter, the viscosity was adjusted to 500 cp. with a mixture of solvent-naphtha and cresol DAB IV at a ratio of 70:30.

The finished wire lacquer had a solids content of 28%. This lacquer was then applied to a wire at the same conditions as stated in Example A, the drawing speed being 5.5 m./min. The evaluation of the wire showed the following:

Peripheral fiber stretch (determined according to Beel, Romm and Luthardt, ETZ–A, vol. 77, issue 22, p. 830)—55%

Hardness of the lacquer insulation (determined as in Example A)—4H

Heat-shock test according to DIN 46453—1 hour, 200° C. single diameter

Softening temperature according to DIN 46453—350° C.

Wire aging: After 24 hours aging at 200° C., the insulation was coil-proof when coiled about its single diameter under a tensile stress of 0.5 kp./mm.$^2$.

The following examples illustrate the ester imide lactam mixtures of the invention and also a combination of the several components by simultaneous reaction.

EXAMPLE 1 (ESTER IMIDE-LACTAM MIXTURE

The polyester imide wire lacquer as described above in Example B was mixed with the polyester lactam lacquer describde in Example A at a ratio of 65:35. The lacquer mixture was then applied to the wire and was tested as follows, the wire being a round copper wire.

Drawing speed—7.0 m./min.

Hardness of the lacquer insulation—5 H.

Heat-shock test according to DIN 46453—1 hour at 200° C., single diameter

Peripheral fiber stretch—72.5%

Softening temperature according to DIN 46453—350° C.

Wire aging: After 24 hours aging at 200° C., the insulation was coil-proof when coiled about its own single diameter under a tensile stress of 0.5 kp./mm.$^2$. The lacquer surface was smooth and uniform.

EXAMPLE 2

The polyester imide wire lacquer and the polyester lactam wire lacquer were mixed as in Example 1 but at a ratio of 50:50. The drawing speed was 7 m./min. The testing of the coated wire showed the following:

Hardness—6 H.

Heat-shock test according to DIN 46453—1 hour at 200° C. simple diameter

Peripheral fiber stretch—72.5%

Softening temperature—340° C.

Wire aging: After 24 hours aging at 200° C., the insulation was coil-proof when coiled about its simple diameter under a tensile stress of 0.5 kp./mm.$^2$. The lacquer surface was smooth and uniform.

EXAMPLE 3

The same polyester imide lacquer and the polyester lactam lacquer were mixed at a ratio of 80:20 as in Example 1. The drawing speed was again 7 m./min.

The testing of the coated wire had the following results:

Hardness of lacquer insulation—5 H.

Heat-shock test according to DIN 46453—1 hour at 200° C., simple diameter

Peripheral fiber stretch—64%

Softening temperature according to DIN 46453—350° C.

Wire aging: same results as in previous example, simple diameter.

EXAMPLE 4

This example illustrates the formulation of the wire lacquer in a single reaction.

93 g. glycol, 285 g. trisbetahydroxyethylisocyanurate 396 g. 4,4′-diaminodiphenylmethane, 499 g. trimellitic acid anhydride, 181 g. itaconic acid and 291 g. cresol DAB IV were placed in an apparatus as described in Example 1. The reaction mixture was heated to 120° C. There were then added 15 g. of a 10% solution of butyl titanate monomer in cresol DAB IV. The mass was then further heated up to 220° C. At 140° C. a strong precipitation of the formed dicarboxylic acids occurred. At 200° C. the mass became clear. After reaching 220° C., condensation was continued at this temperature for 2 hours. 165 ml. of a predominantly aqueous distillate were then distilled off. Subsequently 682 g. of cresol DAB IV/M were added. The Mass was then cooled to 140° C. and was reacted with 10% of a 10%-concentrated butyl titanate solution in cresol DAB IV. The reaction mass was then adjusted to a viscosity of 500 cp. with a solvent mixture consisting of 80 parts of solvent-naphtha and 20 parts of cresol DAB IV.

The thus-obtained lacquer had a solids content of 29%. The lacquer was applied to a wire as described in Example 1. The lacquer surface of the wire thus coated was smooth. The tests showed the following results:

Drawing speed—7.0 m./min.

Hardness of lacquer insulation—5 H.

Heat-shock test according to DIN 46453—1 hour at 200° C.

Peripheral fiber stretch—72.5%

Softening temperature according to DIN 46453—350° C.

Wire aging: After 24 hours aging at 200° C., the insulation proved coil-proof about its simple diameter upon a tensile stress of 0.5 kp/mm.$^2$. The lacquer surface was smooth and uniform.

We claim:

1. A modified polyester-imide resin that is soluble in cresol and is adapted for use in wire-insulating lacquers which consists essentially of a condensation product comprising at least one five-membered lactam and at least one five-membered imide ring in its structure that is formed from (a) at least one ethylenically unsaturated polycarboxylic acid of the group consisting of itaconic acid and aconitic acid, (b) at least one polycarboxylic acid of the group consisting of trimellitic acid, pyromellitic acid, naphthalenetetracarboxylic acid, and anhydrides of each of these acids, (c) at least one polyhydric alcohol of the group consisting of ethylene glycol, propylene glycol, butylene glycol, glycerol, trimethylolopropane, pentaerythritol, and tris - ($\beta$-hydroxyethyl)isocyanurate, (d) at least one primary amino compound of the group consisting of ethanolamine, propanolamine, glycine, aminopropionic acid, aminocaproic acid, aminobenzoic acid benzidine, 4,4′-diaminodiphenylmethane, phenylenediamine, toluylenediamine, and xylylenediamine, in such amounts by weight that the ratio of the compounds from which the lactam rings are formed to the compounds from which the imide rings are formed is between 1:1 and 1:4.

2. A modified polyester-imide resin as defined in claim 1 in which the ratio in amounts by weight of the compounds from which the lactam rings are formed to the compounds from which the imide rings are formed is 1:2.

3. A modified polyester-imide resin as defined in claim 1 that consist essentially of a condensation product formed from ethylene glycol, tris-($\beta$-hydroxyethyl)isocyanurate, 4,4′-diaminodiphenylmethane, trimellitic acid anhydride, and itaconic acid.

4. A process for forming a modified polyester-imide resin that is soluble in cresol and is adapted for use in wire-insulating lacquers which consists essentially of a condensation product comprising at least one five-membered lactam and one five-membered imide ring in its structure which comprises heating together in a solvent therefor and in the presence of a condensation catalyst (a) at least one ethylenically unsaturated polycarboxylic acid of the group consisting of itaconic acid and aconitic acid, (b) at least one polycarboxylic acid of the group consisting of trimellitic acid, pyromellitic acid, naphthalenetetracarboxylic acid, and anhydrides of each of these acids, (c) at least one polyhydric alcohol of the group consisting of ethylene glycol, propylene glycol, butylene glycol, glycerol, trimethylolopropane, pentaerythritol, and tris-($\beta$-hydroxyethyl)isocyanurate, (d) at least one primary amino compound of the group consisting of ethanolamine, propanolamine, glycine, aminopropionic acid, aminocaproic acid, aminobenzoic acid benzidine, 4,4′-diaminodiphenylmethane, phenylenediamine, toluylenediamine, and xylylenediamine, in such amounts by weight that the ratio of the compounds from which the lactam rings are formed to the compounds from which the imide rings are formed is between 1:1 and 1:4.

5. A process as defined in claim 4 which comprises heating together in a solvent therefor and in the presence of a condensation catalyst ethylene glycol, tris-(β-hydroxyethyl)isocyanurate, 4,4'-diamininodiphenylmethane, trimellitic acid anhydride, and itaconic acid.

6. A process as defined in claim 4 in which the solvent is cresol.

7. A process as defined in claim 4 in which the condensation catalyst is butyl titanate.

8. A process as defined in claim 4 in which the heating is conducted to a final temperature of approximately 220° C.

References Cited

UNITED STATES PATENTS

| 2,777,830 | 1/1957 | Shivers | 260—75 |
| 3,136,738 | 6/1964 | Hedrick et al. | 260—45.5 |
| 3,458,480 | 7/1969 | Schmidt et al. | 260—75 |
| 3,505,272 | 4/1970 | Gagliani | 260—33.8 |

FOREIGN PATENTS

| 1,055,287 | 1/1967 | Great Britain. |
| 1,436,978 | 3/1966 | France. |

MELVIN, GOLDSTEIN, Primary Examiner

U.S. Cl. X.R.

117—128.4, 232; 260—33.4 P, 857